United States Patent
Bobel

(10) Patent No.: US 8,938,781 B1
(45) Date of Patent: *Jan. 20, 2015

(54) SYSTEMS AND METHODS FOR MANAGING USER PERMISSIONS

(71) Applicant: Dell Software Inc., Aliso Viejo, CA (US)

(72) Inventor: Robert Bobel, Westerville, OH (US)

(73) Assignee: Dell Software Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/082,397

(22) Filed: Nov. 18, 2013

Related U.S. Application Data

(63) Continuation of application No. 11/850,561, filed on Sep. 5, 2007, now Pat. No. 8,601,539.

(60) Provisional application No. 60/842,710, filed on Sep. 6, 2006.

(51) Int. Cl.
    *H04L 9/32*     (2006.01)
    *H04L 29/06*     (2006.01)

(52) U.S. Cl.
    CPC .................................... *H04L 63/08* (2013.01)
    USPC ...................................... 726/2; 726/3; 726/4

(58) Field of Classification Search
    USPC ............ 716/1–6, 12, 17–18, 27–30; 713/150, 713/154, 159, 164, 166, 185; 709/202, 223, 709/225, 229; 726/1–6, 12, 17–18, 27–30
    See application file for complete search history.

(56) References Cited

U.S. PATENT DOCUMENTS

| | | | |
|---|---|---|---|
| 5,911,143 | A | 6/1999 | Deinhart et al. |
| 6,038,677 | A | 3/2000 | Lawlor et al. |
| 6,088,679 | A | 7/2000 | Barkley |
| 6,275,825 | B1 | 8/2001 | Kobayashi et al. |

(Continued)

FOREIGN PATENT DOCUMENTS

JP      11-194974      7/1999

OTHER PUBLICATIONS

Access Control List, http://en.wikipedia.org, dated Mar. 24, 2011.

(Continued)

*Primary Examiner* — Hosuk Song
(74) *Attorney, Agent, or Firm* — Winstead PC

(57) ABSTRACT

Multi-tiered systems and methods for identifying and monitoring user permissions in a computer network are described. A data structure, such as an index, for each network device identifies all the security identifiers (SIDs) and their associated permissions for accessing the resources on the network device. Each data structure can be initially populated by scanning access control lists (ACLs) of the respective network device. A collection server in communication with the network devices stores an aggregate index that identifies the SIDs in the network and the network devices on which each SID is granted, denied or revoked one or more permissions. The individual data structures and/or aggregate index are updated based on permission changes detected through real-time or periodic monitoring. The aggregate index can also be replicated to multiple servers. In certain examples, the multi-tiered arrangement facilitates identifying the network resources for which a user has been granted, denied or revoked a permission.

20 Claims, 7 Drawing Sheets

(56) References Cited

U.S. PATENT DOCUMENTS

| | | | |
|---|---|---|---|
| 6,499,031 | B1 | 12/2002 | Hopmann et al. |
| 6,665,714 | B1 | 12/2003 | Blumenau et al. |
| 6,978,381 | B1 | 12/2005 | Te et al. |
| 7,340,770 | B2 * | 3/2008 | Freund .............................. 726/11 |
| 7,574,734 | B2 | 8/2009 | Fedronic et al. |
| 7,703,135 | B2 | 4/2010 | Bender et al. |
| 7,877,796 | B2 * | 1/2011 | Smith .............................. 726/13 |
| 7,912,971 | B1 * | 3/2011 | Dunn .............................. 709/229 |
| 8,020,194 | B2 * | 9/2011 | Lambert et al. .................... 726/3 |
| 8,239,923 | B2 * | 8/2012 | Kirshnan et al. ................... 726/5 |
| 8,326,874 | B2 | 12/2012 | Wright et al. |
| 8,387,136 | B2 | 2/2013 | Lee et al. |
| 8,601,539 | B1 * | 12/2013 | Bobel .............................. 726/2 |
| 8,639,827 | B1 | 1/2014 | Dinn et al. |
| 2002/0026592 | A1 | 2/2002 | Gavrila et al. |
| 2002/0188597 | A1 | 12/2002 | Kern et al. |
| 2004/0243672 | A1 | 12/2004 | Markki et al. |
| 2005/0210409 | A1 | 9/2005 | Jou |
| 2007/0088744 | A1 | 4/2007 | Webber et al. |
| 2007/0244899 | A1 | 10/2007 | Faitelson et al. |
| 2008/0155078 | A1 | 6/2008 | Parkkinen et al. |
| 2009/0024741 | A1 | 1/2009 | Roach |
| 2009/0044011 | A1 | 2/2009 | Russell et al. |
| 2010/0005514 | A1 | 1/2010 | Chen |
| 2010/0005518 | A1 | 1/2010 | Tirpak et al. |
| 2010/0211989 | A1 | 8/2010 | Julisch et al. |
| 2011/0264737 | A1 | 10/2011 | Skinner |
| 2013/0091280 | A1 | 4/2013 | Rajakarunanayake et al. |

OTHER PUBLICATIONS

Active Directory, http://en.wikipedia.org, dated Mar. 24, 2011.
Security Identifier, http://en.wikipedia.org, dated Mar. 24, 2011.
Microsoft Technet, Active Directory Users, Computers, andd Groups, printed Jan. 25, 2011, Hyperlink "http://technet.microsoft.com/en-us/library/bb727067(printer).aspx" 21 pages.
Microsoft Technet, Best Practices for Assigning Permissions on Active Directory Objects, updated Jan. 21, 2005, Hyperlink "http://technet.microsoft.com/en-uslibrary/cc786285(v=ws.10).aspx" 3.

* cited by examiner

| SID | Resource |
|---|---|
| SID 1 | Resource A |
| SID 1 | Resource C |
| SID 2 | Resource A |
| SID 2 | Resource B |
| SID 2 | Resource D |
| SID 3 | Resource F |
| SID 4 | Resource A |
| SID 4 | Resource E |

FIG. 2A

| SID | Resource | Resource Type(s) |
|---|---|---|
| Bob | Computer 1 | File, Registry |
| Bob | Computer 3 | File |
| John | Computer 2 | Application |
| Mary | Computer 1 | Application, Database, File |
| Mary | Computer 2 | File, Folder |
| Mary | Computer 4 | Database, File |

FIG. 2B

Indexed Resource Hosts

*These are all of the Resource Hosts which have had their security information indexed*

| Indexed Host | Trustees | Indexer Machine | IndexMethod | Most Recent Activity | Data Freshness |
|---|---|---|---|---|---|
| MANWE | 45 | MANWE | LOCAL | 8/29/2007 2:49:58 PM | GOOD |
| TURIN | 21 | TURIN | LOCAL | 8/29/2007 2:50:32 PM | GOOD |

550

Trustees Identified on: MANWE

*The following trustees have explicit access to resources on the system*

| Trustee Name | TrusteeSid | Resource Type | Trustee Type |
|---|---|---|---|
| Everyone | S-1-1-0 | NTFS/FILE | Well Known |
| Everyone | S-1-1-0 | NTFS/Folder | Well Known |
| Everyone | S-1-1-0 | Windows Computer/Local User Rights | Well Known |
| Everyone | S-1-1-0 | Windows Computer/Share | Well Known |
| CREATOR OWNER | S-1-3-0 | NTFS/Folder | Well Known |
| NT AUTHORITY/Authenticated Users | S-1-5-11 | NTFS/FILE | Well Known |
| NT AUTHORITY/Authenticated Users | S-1-5-11 | NTFS/Folder | Well Known |
| NT AUTHORITY/Authenticated Users | S-1-5-11 | Windows Computer/Local User Rights | Well Known |
| NT AUTHORITY/Authenticated Users | S-1-5-11 | Windows Computer/Share | Well Known |
| NT AUTHORITY/System | S-1-5-18 | NTFS/FILE | USER |

SYSTEMS AND METHODS FOR MANAGING USER PERMISSIONS

CROSS-REFERENCE TO RELATED APPLICATIONS

This application is a continuation of U.S. patent application Ser. No. 11/850,561, filed on Sep. 5, 2007. U.S. patent application Ser. No. 11/850,561 claims the benefit of priority under 35 U.S.C. §119(e) of U.S. Provisional Application No. 60/842,710, filed on Sep. 6, 2006. U.S. patent application Ser. No. 11/850,561 and U.S. Provisional Application No. 60/842, 710 are hereby incorporated herein by reference in their entirety.

BACKGROUND OF THE INVENTION

1. Field of the Invention

Embodiments of the invention relate to managing permissions in a network environment and, in particular, to systems and methods for maintaining permission information for a plurality of network users.

2. Description of the Related Art

Authentication and authorization are two important processes in maintaining security in a computer network environment. Many directories (e.g., Microsoft's ACTIVE DIRECTORY), network operating systems or other software systems authenticate a user's identity through the use of credentials, such as a unique combination of a username and password. When the user attempts to exercise a right or permission, the system can prompt the user to provide the appropriate credentials. In this way, intelligent decisions about granting, denying or revoking rights or permissions to computer resources, data, a computer network and/or to perform administrative tasks or other activities can be controlled and restricted to particular user(s) or group(s) of users.

Sometimes, however, a username can change, and/or multiple users may be given access to a single username. In view of the foregoing, computer systems are often programmed to assign to each user or group of users a unique identification, such as a security identifier (SID), that generally remains constant. In certain embodiments, the management of permissions is performed by associating a SID with each permission that the user has been granted, denied or revoked with respect to a particular resource (i.e., authorization).

Over time, as users and/or groups are granted, denied, revoked and/or changed permissions with respect to particular resources, the number of places in which the user's or group's SID is used grows tremendously. For instance, it would not be unreasonable to find in a single organization millions of permissions assigned to SIDs with respect to resources on network devices. This becomes particularly challenging when an auditor or administrator needs to determine where a specific user or group has been granted, denied or revoked permissions. Moreover, because of the distributed nature of most computer networks, some of which may span the globe, it is often logistically difficult to determine where to look to identify where a user or group has been granted, denied or revoked permissions to resources.

A typical method for determining where a user or group has been granted, denied or revoked permissions is to use a customized application designed to read security permissions in the entire network. Thus, each time the effective rights or permissions for a user or group need to be identified, the permissions listing for each resource on each computer on the network is scanned. In medium and large environments with dozens, hundreds or thousands of computers, the volume of data and computer processing power for such scans can easily consume available resources and disrupt other users. Moreover, once these scans have been completed, the results are immediately out-of-date as additional permissions are granted, denied, revoked and/or modified.

Another problem with attempting to scan the entire network environment to find the cumulative permissions of a user or group is that there is a high likelihood that no permission has been granted to a user or group on a particular computer; however, each computer on the network still must be scanned to eliminate such a possibility. Moreover, such scans can generate incomplete results if one or more of the network devices is offline or otherwise unavailable during the scan.

SUMMARY OF THE INVENTION

In view of the foregoing, what is needed are improved systems and methods for managing user permissions in a computer network system. For example, a need exists for facilitating the tracking and maintaining of a record of permissions for users and/or groups of users. Moreover, a need exists for straightforward systems and methods for quickly determining where to look for one or more permissions granted, denied or revoked with respect to a user or group of users.

In certain embodiments, a system is disclosed for managing user permissions in a computer network environment. The system comprises a collection server and a first computing device of a plurality of network devices communicatively coupled to the collection server. The first computing device further comprises a first resource; a first data structure associated with the first resource, the first data structure identifying a first security identifier (SID) and a first permission granted to the first SID with respect to the first resource; a second resource; a second data structure associated with the second resource, the second data structure identifying a second SID and a second permission granted to the second SID with respect to the second resource, and a first SID index associating the first and second SIDs with, respectively, the first and second resources. The system also comprises an aggregate index stored on the collection server, the aggregate index associating each of the first and second SIDs with the first computing device and associating a third SID with a second computing device of the plurality of network devices.

In certain embodiments, a method is disclosed for managing user permissions in a network system. The method comprises, for each of a plurality of computing devices of a network system: scanning a plurality of data structures, each data structure being associated with at least one of a plurality of resources on the computing device; identifying from the plurality of data structures a plurality of security identifiers (SIDs) associated with a plurality of permissions granted to the plurality of SIDs with respect to the plurality of resources; and compiling a SID index associating the plurality of SIDs with the plurality of resources. The method also comprises transmitting from each of the plurality of computing devices the respective plurality of SIDs and an identification of the corresponding computing device; and compiling at a collection server an aggregate index associating each of the plurality of SIDs with the identification of the corresponding computing device on which the particular SID was found.

In certain embodiments, a multi-tiered system is disclosed for managing user permissions on a plurality of network devices. The multi-tiered system comprises a plurality of computing devices, each computing device further comprising: means for identifying from a plurality of data structures attached to a plurality of resources on the computing device a plurality of security identifiers (SIDs) associated with a plurality of permissions granted to the plurality of SIDs for accessing the plurality of resources; and first means for associating each of the plurality of SIDs with the plurality of resources. The multi-tiered system also comprises means for transmitting from each of the plurality of computing devices the respective plurality of SIDs and an identification of the corresponding computing device; and second means for associating each of the plurality of SIDs with the identification of the corresponding computing device on which each particular SID was found.

In certain embodiments, a method is disclosed for storing user permissions in a network environment. The method includes creating a master or aggregate index of unique security identifiers (SIDs) associated with the network environment. In certain embodiments, an index is initially populated for each designated computing device on the network by scanning the designated device. The method further includes collecting the indices from the network computing devices and compiling and/or storing the aggregate index on a collection server.

In certain embodiments, the method further includes replicating the aggregate index to multiple computing devices. Such replication can include SQL replication, file replication, and/or can involve copying the indices to one or more ActiveRoles servers. In certain embodiments, the method further includes periodically updating the aggregate index as user permissions are newly assigned and/or modified.

In certain embodiments, a multi-tiered system is disclosed for managing user permissions in a network environment, such as, for example, a Windows-based environment that utilizes Microsoft's ACTIVE DIRECTORY. The system includes a plurality of computing devices coupled to a network. Each computing device comprises one or more data structures that identify unique identifiers of person(s) and/or group(s) that have access, or partial access, to resources stored on the computing device(s). The system further includes a central database for associating each unique identifier with one or more of the respective computing devices and for storing the associations. In certain embodiments, the central database comprises a look-up table for associating each unique identifier with each computing device for which the unique identifier has been assigned one or more permissions on a resource.

In certain embodiments, a user interface is disclosed for obtaining and/or displaying information regarding user permissions. In certain embodiments, the user interface displays user permissions assigned to a particular individual and/or group. For example, the user interface can identify all the computing devices in a network system containing resources to which the individual or group has been granted, denied or revoked permissions.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 2A illustrates an exemplary embodiment of a SID index usable by a computing device of the computer network system of FIG. 1.

FIG. 2B illustrates an exemplary embodiment of an aggregate index usable by the computer network system of FIG. 1.

FIG. 5 illustrates an exemplary embodiment of a user interface depicting SID information for computing devices on a network.

DETAILED DESCRIPTION OF THE PREFERRED EMBODIMENTS

Figure 1:
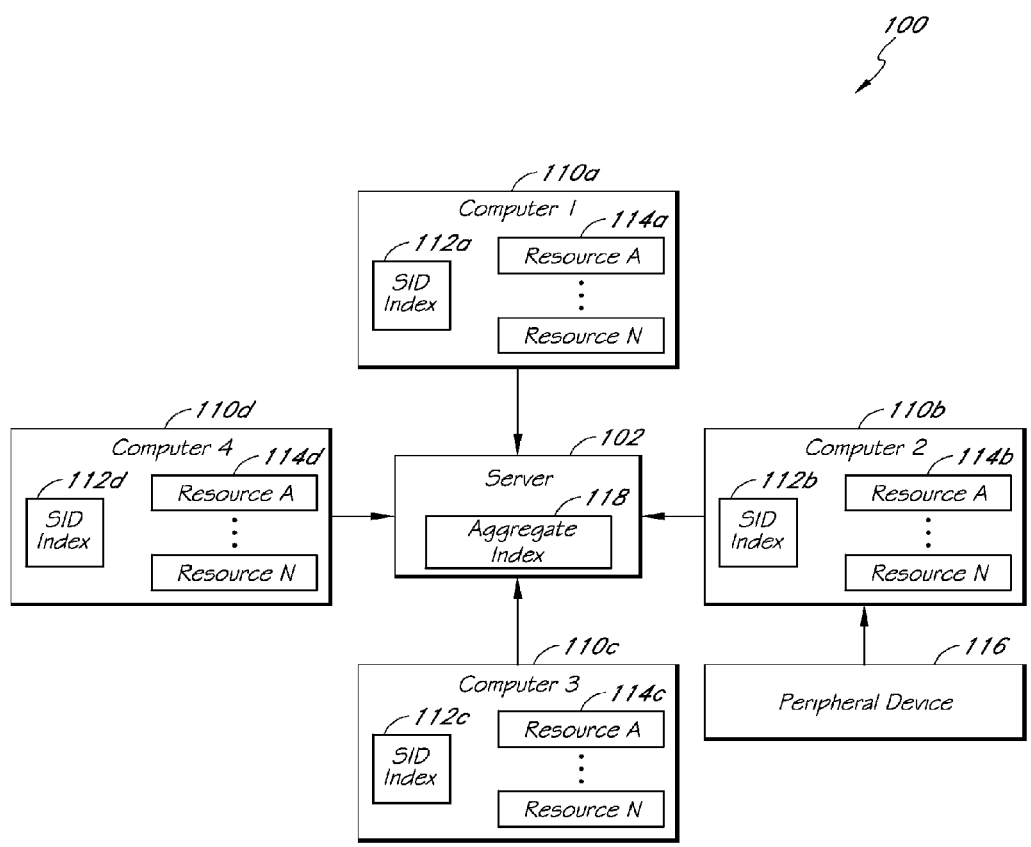
FIG. 1 illustrates a block diagram of a computer network system for managing user permissions according to certain embodiments of the invention.

Systems and methods disclosed herein provide improved systems and methods for managing user permissions in a computer network environment. For instance, certain embodiments of the invention facilitate the tracking and maintenance of a record of permissions associated with users and/or groups of users. Moreover, certain disclosed systems and methods can facilitate determining all the permissions associated with a network user (e.g., by identifying computing devices having resources to which a user has been granted, denied and/or revoked a permission).

In general, embodiments of the invention involve the use of one or more unique identifiers to represent a user or group of users in a network environment. For exemplary purposes, the unique identifier will be referred to hereinafter as a security identifier (SID). For example, such SIDs may include a user identifier (UID), a group identifier (GID), combinations of the same or the like. However, it will be understood from the disclosure herein that, in other embodiments (e.g., LINUX systems), other types of security identification may be used.

Moreover, the term "permission" as used herein is a broad term and is used in its ordinary sense and includes, without limitation, the granting, denying or revoking of access (e.g., read, write, execute) to resources, the ability to perform tasks within an application, the ability to perform operating system or directory administrative tasks (such as change software settings, install applications or grant or deny permissions to other users), roles, privileges or the like. The term "right" as used herein is also used synonymously and interchangeably with the term "permission."

In certain computing systems, a list of permissions is attached or affiliated with an object or resource. In certain embodiments, the list of permissions is referred to as an access control list (ACL) that specifies who has what type of access to the resource. In particular, in Microsoft Windows, UNIX and MAC OS X operating systems, each ACL comprises one or more access control entries (ACEs) that links a SID with a specific permission granted, denied or revoked to the SID with respect to resources on the computer. When the user attempts to access the resource, the SID associated with the user is compared to the SIDs in the resource's ACL and, if found, the user may exercise the rights granted to him or her as defined within the ACL.

As discussed above, over time the number of ACEs defining permissions for network resources can increase substantially. For instance, a fresh installation of Microsoft Windows Server can result in the creation of tens of thousands of ACEs in thousands of ACLs. Due to the volume of ACEs and ACLs, and because of the distributed nature of most computer networks, it is logistically difficult to determine where a single user or group has been granted, denied or revoked permissions.

Moreover, in an ACTIVE DIRECTORY environment, user and group SIDs are stored within the ACTIVE DIRECTORY database. When a permission is granted on a resource outside of the ACTIVE DIRECTORY database, the database is queried and the SID of the user or group is obtained and placed in the ACE in the ACL of the resource. From that point forward, there is no reference linking the SID in ACTIVE DIRECTORY to the SID in an ACE of an ACL. If a user or group in ACTIVE DIRECTORY is deleted, there currently exists no straightforward mechanism to remove the corresponding SID (s) from the ACEs. Such a situation can result in numerous "dangling" SIDs being left in ACLs throughout a network, wherein the SID(s) are not linked to a particular user.

Certain embodiments of the invention address the foregoing drawbacks by providing improved systems and methods for continually or periodically (e.g., on a scheduled basis) indexing a unique list of SIDs found on one or more computers for the purpose of quickly identifying on which computers a specific SID has been granted or denied permissions to one or more resources. Instead of attempting to analyze ACEs in ACLs only when the permissions for users or groups needs to be determined, such embodiments can advantageously create and maintain in real time a unique list of SIDs found on a given computer.

The features of the systems and methods will now be described with reference to the drawings summarized above. Throughout the drawings, reference numbers may be re-used to indicate correspondence between referenced elements. The drawings, associated descriptions, and specific implementation are provided to illustrate embodiments of the invention and not to limit the scope of the disclosure.

In addition, methods, functions and processes described herein are not limited to any particular sequence, and the blocks or states relating thereto can be performed in other sequences that are appropriate. For example, described blocks or states can be performed in an order other than that specifically disclosed, or multiple blocks or states can be combined in a single block or state.

Moreover, although several of the examples illustrated herein refer to ACLs for identifying the permissions granted, denied or revoked for a particular resource, other types of data structures may be used. For instance, in certain embodiments, permissions may be derived from certain naming conventions or the like.

FIG. 1 illustrates a computer network system 100 for managing user permissions according to certain embodiments of the invention. As illustrated, the system 100 includes a server 102 in communication with a plurality of resource hosts (e.g., computing devices). In certain embodiments, the server 102 comprises a centralized searchable location, such as a single collection server. In yet other embodiments, the server 102 may comprise multiple computers located proximate or remote to each other (e.g., deployed to provide scalability).

As shown in FIG. 1, the server 102 communicates with computer 110a, computer 110b, computer 110c and computer 110d. In certain embodiments, one or more of the computers 110a-110d may comprise any type of resource host or computing device, such as, for example, a network computer, a server, a portable digital assistant, a workstation, a smartphone, a laptop, a virtual device, or the like. The network may comprise, for example, an Internet-based network, a token ring or TCP/IP based network, a wide area network (WAN), local area network (LAN), an intranet network, combinations of the same or the like.

Each of the computers 110a-110d further comprises an index data structure and one or more resources. For instance, computer 110a comprises a SID index 112a and resource(s) 114a, computer 110b comprises a SID index 112b and resource(s) 114b, computer 110c comprises a SID index 112c and resource(s) 114c, and computer 110d comprises a SID index 112d and resource(s) 114d.

In certain embodiments, the illustrated resources comprise any object or entity that is configured to have one or more rights and/or permissions associated therewith, such as identified in an ACL. For instance, a resource can comprise a software entity, a physical entity or a virtual entity. In certain embodiments, a resource can comprise one or more of the following types: a file, a folder, a database, an application (e.g., a fax application), files or functions within an application, an operating system, a directory (e.g., ACTIVE DIRECTORY), a subdirectory, a registry, a hard drive, a website, a web server, a print server, a printer, a mailbox, a file system (e.g., NTFS), or the like.

In certain embodiments, each resource is preferably further associated with an ACL that identifies who or what is allowed to access the resource and what type of operations are allowed to be performed on the resource. In particular, in certain embodiments, each ACL comprises one or more entries (e.g., ACEs) that each identify a particular subject through a SID and an operation that may be performed on the resource by that subject.

As shown, each computer 110a-110d comprises the SID index 112a-112d, respectively. Each of the SID indices 112a-112d comprises a data structure that identifies which SIDs are associated with permissions for resources on the particular computer. For instance, the SID index can provide a list of all the SIDs on the computer and which resources to which each SID has been granted, denied and/or revoked some type of permission. In further embodiments, the SID indices 112a-112d can identify the types of resources associated with the SID and/or the types of permissions associated with the SIDs. For instance, a entry in the SID index may include a flag for identifying the particular resource type. In certain preferred embodiments, however, in order to conserve space and/or simplify the SID index, the SID index consists substantially of SIDs and the associated computer resources to which the SIDs have been granted, denied or revoked permissions.

In certain embodiments, the SID index preferably comprises a searchable data structure, such as stored in a SQL database. In other embodiments, the SID index may be in the form of a list, a table, a file (e.g., an XML file), a spreadsheet, an object, combinations of the same or the like.

In certain embodiments, the network system 100 includes one or more devices that do not store, and/or are not configured to store, an ACL. For example, such network devices may not be capable of running an operating system, such as Windows Server 2003. In certain embodiments, these network devices can have a SID index created and/or maintained remotely for them. For instance, a SID index for the particular device may be created and maintained by another computing device. In yet other embodiments, the SID index information for a network device may be transmitted to and stored in an aggregate index, as discussed in more detail below.

As shown, the network system 100 further includes a peripheral device 116 coupled to the computer 110b. In certain embodiments, the peripheral device 116 comprises a printer, an attached storage device or other network device that does not maintain its own SID index and/or wherein a SID index is stored remote from the network device. In the illustrated embodiment, the computer 110*b* can create and/or maintain a SID index for the peripheral device 116 and/or send update information to the server 102 regarding the peripheral device 116.

The server 102 further comprises an aggregate index 118. In certain embodiments, the aggregate index 118 includes a compilation of the individual SID indices 112*a*-112*d* from the computers 110*a*-110*d*. For example, the aggregate index 118 advantageously provides for a centralized searchable location that maps which computers would need to be searched to gain a complete list of where a user or group was granted permissions to one or more resources.

In certain embodiments, the aggregate index 118 does not contain actual ACE information but associates SIDs with appropriate computing devices. Thus, knowing that a specific user or group has some sort of permission on a particular computer eliminates the need to scan every computer when determining where a user or group has some right or permission.

In other embodiments, the network system 100 may comprise multiple, aggregate indices. For instance, in systems having multiple collection servers (e.g., ActiveRoles servers), each aggregate index can be replicated (e.g., through SQL replication or file replication) to each server. In other embodiments, the multiple aggregate indices may contain different information, depending on the environment of the particular aggregate index. For example, in certain embodiments, the network system 100 may comprise a third index, such as a master index, that comprises information from each of the different, aggregate indices.

In certain embodiments, the aggregate index 118 associates each SID with one or more resources on which the particular SID is associated with at least one permission. In certain embodiments, the aggregate index 118 comprises a searchable index similar to the SID indices 112*a*-112*d*. For instance, the aggregate index 118 can be stored in a SQL database that allows for an efficient query language to search the database. In other embodiments, the aggregate index 118 may be in the form of a list, a table, a file (e.g., an XML file), a spreadsheet, an object, combinations of the same or the like.

FIG. 2A illustrates an exemplary embodiment of a SID index 214 usable by the computer network system 100 of FIG. 1. As shown, the SID index 214 comprises a two-column table including a SID column 220 and a resource column 222. In certain embodiments, the SID column 220 provides a list of all the SIDs present on a particular computing device, such as one of the computers 110*a*-110*d* of FIG. 1. For instance, the SID column 220 may include the actual SID and/or the user or group name assigned to the SID. The resource column 222 identifies the resources on the particular computer that are associated with some permission. Thus, for each SID-resource combination, the SID index 214 comprises a single entry (e.g., a row). For instance, the SID index 214 includes a row 224 that identifies SID 1 as having been granted, denied or revoked a permission with respect to Resource A on the particular computer.

In other embodiments, the SID index 214 may include a different arrangement and/or may comprise additional information. For example, in other embodiments, the SID index 214 can include a single entry for each SID on the particular computer and identify all the resources associated with the SID. In yet other embodiments, the SID index 214 can further include the type(s) of resources listed in the resource column 222. In yet other embodiments, the SID index 214 can include additional information with respect to the types of permissions or users involved.

FIG. 2B illustrates an exemplary embodiment of an aggregate index 218 usable by the computer network system 100 of FIG. 1. As discussed above, the aggregate index 218 in certain embodiments is advantageously configured to identify the network computer(s) on which a SID is granted, denied and/or revoked a permission to a resource.

As illustrated, the aggregate index 218 includes a SID column 226, a computer name column 228 and a resource type column 230. In certain embodiments, the SID column 226 provides a list of all the SIDs that are granted and/or denied at least permission on a network device of a computer network system. For each entry in the SID column 226, the computer name column 228 identifies the corresponding computer on which the SID is found. The resource type column 230 further identifies the type(s) of resource(s) that are associated with the SID on the particular computer. For example, entry 232 in the aggregate index 218 indicates that the SID "Bob" is found on Computer 1 and has been granted, revoked and/or denied a permission for a file and a registry on Computer 1.

In other embodiments, the aggregate index 218 can include a different arrangement and/or may comprise additional information. For example, in other embodiments, the aggregate index 218 can consist essentially of the SID column 226 and the computer name column 228 (not the resource type column 230). In yet other embodiments, the aggregate index 218 can include a single entry for each SID on the network identifying all the computers on which the SID has been granted, denied and/or revoked a permission to a resource.

In yet other embodiments, the aggregate index 218 can include additional information with respect to the types of permissions involved. In such embodiments, not only knowing which user or group SIDs are present on one or more computers, but also knowing the type(s) of permissions those SIDs have been granted can make it easier to filter queries of the aggregate index 218.

Figure 3:
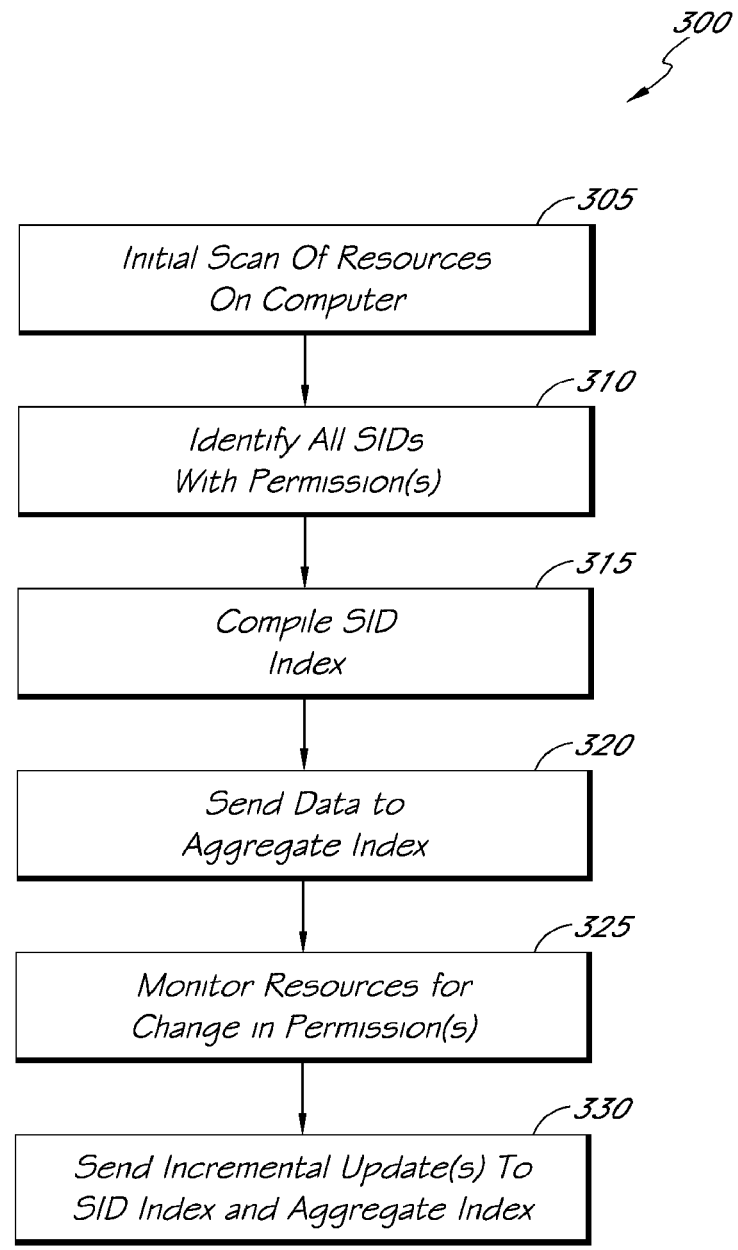
FIG. 3 illustrates a flowchart of an exemplary embodiment of a permission management process for creating and maintaining an aggregate index usable by the computer network system of FIG. 1.

FIG. 3 illustrates a flowchart of an exemplary embodiment of a permission management process 300 for creating and maintaining indices usable by the computer network system 100 of FIG. 1. In particular, the process 300 involves the compilation and maintenance of a SID index and an aggregate index. Although the process 300 will be described with reference to a single computer, it will be understood that the process 300, or a variation thereof, can be performed for each computer in the network system.

The process 300 begins with Block 305, wherein an initial scan is performed on the resource(s) of a computer. For example, a computer-executable software program, or agent module, can be configured to scan the various ACLs of the resources on the computer. In certain embodiments, the process 300 can call the operating system of the computer to perform the initial scan of the various ACLs on the computer. From this initial scan, the process 300 determines all the SIDs that are identified by the ACLs as being associated with a permission to a resource on the computer (Block 310).

The process 300 compiles the list of SIDs into a SID index for the computer, such as in the form of the SID index 214 of FIG. 2A. Next the process 300 sends the compiled data for inclusion in an aggregate index, such as the aggregate index 218 of FIG. 2B.

The process 300 continues by monitoring the resources on the computer for any changes in the permissions (Block 325).

Upon detecting a change, the process 300 updates the SID index and/or aggregate index with the new information (Block 330).

To reduce the amount of data that would need to be updated in the SID index and sent over the network to the aggregate index, incremental updates (e.g., only SIDs that are added or removed from the index) would need to be transmitted in certain embodiments. Because incremental updates contain relatively small amounts of data, the transmission of the updates should not cause a significant impact on network performance. Also since most ACLs are relatively static, impact to computer processing time is also reduced.

Figure 4:
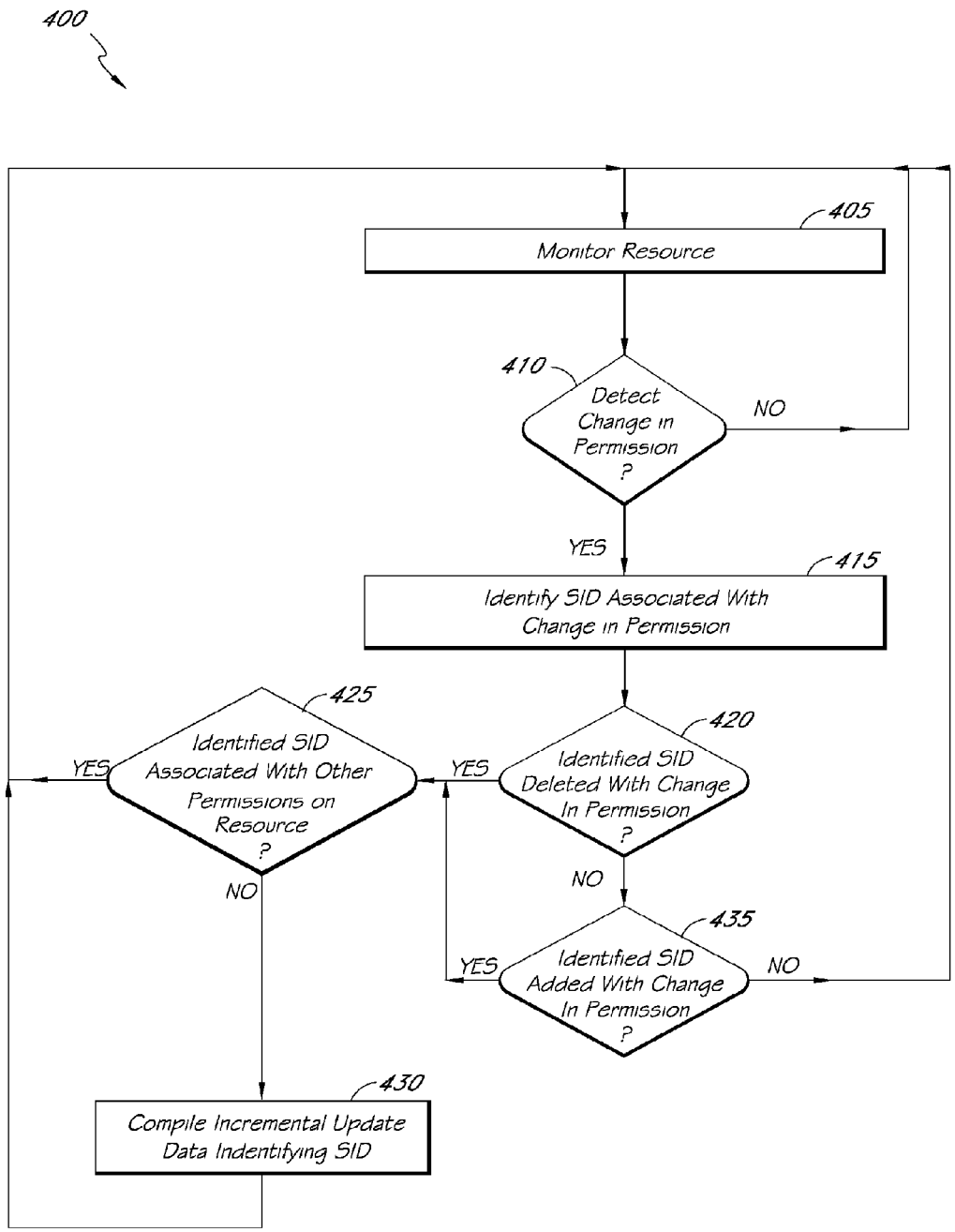
FIG. 4 illustrates a flowchart of an exemplary embodiment of a monitor process for updating indices usable by the computer network system of FIG. 1.

FIG. 4 further illustrates a flowchart of an exemplary embodiment of a monitor process 400 for updating a SID index and/or aggregate index. For instance, in certain embodiments, the illustrated monitor process 400 depicts further details of Block 325 of the permission management process 300 of FIG. 3. For exemplary purposes, the monitor process 400 will be described herein with reference to monitoring a single resource.

In particular, the monitor process 400 begins at Block 405, wherein the process 400 monitors a resource of a computer. If the process 400 does not detect a change in the permissions affiliated with the resource (Block 410), the process 400 continues to monitor the resource. In certain embodiments, such monitoring can be executed in real time, or such monitoring can be performed on a periodic basis (e.g., based on a schedule and/or processing state of the computer). For example, in certain embodiments, Blocks 405 and/or 410 can be triggered upon detecting an interrupt change, an operating system event, such as a change in security, or after detection of drive activity.

If a change in a permission of a resource is detected, the process 400 identifies the SID(s) associated with the change in permission (Block 415). The process 400 also identifies the type of permission change associated with the particular SID. For instance, as shown by Block 420, the process 400 determines if the change in permission involves the deletion of a SID.

If a SID was deleted with the change in permission, the process 400 determines if the particular SID is still associated with other resources on the computer (Block 425). If the SID is associated with permissions to other resources, the process 400 returns to Block 425. On the other hand, if the deleted SID was the last occurrence of the SID on the particular computer, the process 400 proceeds to Block 430 to compile update information with respect to the deleted SID. Such incremental update data would then be used to update the SID index of the computer and/or the aggregate index.

However, if the identified SID was not deleted with a permission change, the process 400 determines whether or not the SID was added with the permission change (Block 435). If the identified SID was not added, the process 400 returns to Block 405. For instance, if the permission associated with a particular SID changed from read to read/write, the process 400 may not need to update any of the indices.

However, if the identified SID was added with the change in permission, the process 400 determines if the particular SID was already associated with other resources on the computer (Block 425). If the added SID was already associated with permissions on other resources on the computer, the process 400 returns to Block 425. On the other hand, if the added SID is not associated with other resources on the computer, the process 400 proceeds to Block 430 to compile update information with respect to the newly added SID. Following Block 430, the process 400 returns to monitor the resources of the computer.

Although the process 400 is described with reference to particular embodiments, it will be understood from the disclosure herein that other embodiments of the monitoring process 400 can be used. For instance, the process 400 can include additional blocks to gather information with respect to the permission change (e.g., type of resource, type of permission) to be included in the incremental updates.

FIG. 5 illustrates an exemplary embodiment of a user interface 500 depicting SID information for indexed resource hosts (e.g., computing devices) on a network. In certain embodiments, the user interface 500 advantageously allows for an administrator or other user to quickly identify all the users and/or groups that have been granted, denied or revoked some type of permission to one or more resources on a computing device.

As shown, the user interface 500 comprises a screen display having an indexed resource hosts section 550 and a SID information section 551. The indexed resource hosts section 550 includes a list of all the resource hosts (e.g., computing devices) that have had their security information indexed. As shown, the indexed resource hosts section 550 identifies two indexed hosts (i.e., MANWE and TURIN). For each listed host, the indexed resource hosts section 550 also identifies, among other things, the number of trustees associated with the host and the most recent activity on the host.

In general, the SID information section 551 is configured to display information related to a particular host selected from the indexed resource hosts section 550. As illustrated in FIG. 5, the SID information section 551 displays information for the indexed host MANWE. In particular, the SID information section 551 includes a trustee name column 552 that identifies all the users and/or groups associated with a permission with respect to a resource on MANWE. A SID column 554 identifies the associated SID for each user or group listed in the trustee name column 552. A resource type column 556 identifies the type of resource involved, and a trustee type column 558 identifies the type of the trustee.

In other embodiments, the user interface 500 may comprise more or less information that what is shown in FIG. 5. For instance, the SID information section 551 may show either the SID column 554 or the trustee name column 552. Moreover, in certain embodiments, the user interface 500 can allow for the selection of multiple indexed hosts in the indexed resource hosts section 550, thereby providing information relating to the multiple hosts in the SID information section 551.

Figure 6:
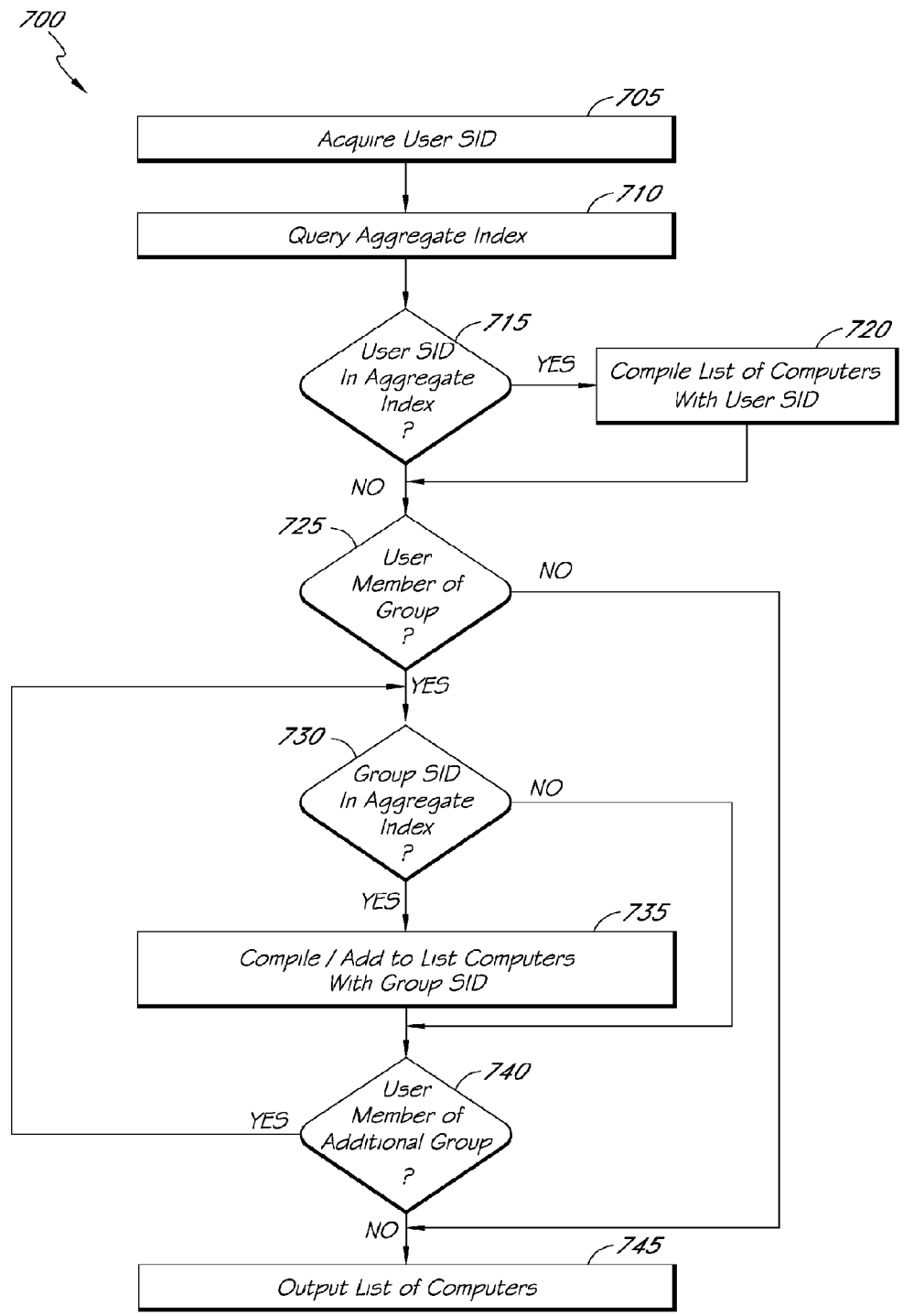
FIG. 6 illustrates a flowchart of an exemplary embodiment of a process for identifying computing devices having one or more resources for which a user is associated with one or more permissions.

FIG. 6 illustrates a flowchart of a process 700 for identifying each computer on which a user is associated with one or more permissions on one or more resources, according to certain embodiments of the invention. In certain embodiments, the identification process 700 provides a more efficient alternative to scanning each network computer for every resource for assigned permissions. For exemplary purposes, the execution of the identification process 700 will be described with reference to the components of system 100 of FIG. 1.

As illustrated, the identification process 700 begins with Block 705, wherein the process 700 acquires the User SID of the subject user. For example, the process 700 can access a directory (e.g., ACTIVE DIRECTORY) to identify the appropriate User SID. At Block 710, the identification process 700 queries the aggregate index 118 of the server 102 and determines if the User SID is present in the aggregate index 118 (Block 715).

If the User SID is listed in the aggregate index 118 (e.g., there is at least one computer on which at least one permission is associated with the User SID), the identification process 700 compiles a list of computers associated with the User SID by the aggregate index 118 (Block 720). Next, or if the subject User SID is not found in the aggregate index 118, the identification process 700 proceeds with Block 725.

At Block 725, the identification process 700 determines if the user is a member of one or more groups. For example, in certain embodiments, the identification process 700 can access an ACTIVE DIRECTORY database that identifies all the groups associated with the particular user. In certain embodiments, if the user is a member of at least one group, a further determination can be made if the at least one group is a member of a larger group. Thus, the determination made during Block 725 can include a recursive process for identifying all the pertinent groups associated with the user.

If the user is not a member of any groups, the identification process 700 jumps to Block 745 to output a list of computers, if any, associated with the User SID in the aggregate index 118. If the user is a member of a group, the identification process 700 determines if the Group SID of an identified group is listed in the aggregate index 118 (Block 730).

If the Group SID is listed in the aggregate index 118, the identification process 700 compiles a list of computers associated with the subject Group SID (Block 735). In situations where a list of computers was compiled with respect to the User SID (Block 720), Block 735 can include updating the existing list with any newly identified computers.

Following Block 735, or if the particular Group SID is not located in the aggregate index 118, the identification process 700 determines if the user is a member of any additional groups (Block 740). If so, the identification process 700 returns to Block 730 to identify additional pertinent computers, if any. Once all the groups of which the user is a member are processed, the identification process 700 proceeds with Block 745 to output the compiled list of computers on which a particular user has one or more rights or permissions.

As can be seen, in certain embodiments, the identification process 700 can be advantageously used, for instance, to quickly identify which computers may need to be accessed during a global change of permissions granted to a particular individual (e.g., upon employment termination, the movement of a user between organizations in a company, and the like.)

Moreover, in certain preferred embodiments, the process 700 does not require the individual scanning of each computer in the network in order to determine where a user is granted, denied or revoked permissions. Rather, the resulting list from the process 700 allows an administrator to focus on a select group of network computers to determine exactly which resources have permissions associated with the user.

Although the identification process 700 has been described with respect to particular arrangements, other embodiments of the process 700 can also be performed. For instance, in situations wherein a user is associated with more than one User SID (e.g., when a user identification has been migrated from an old version of ACTIVE DIRECTORY to a new version), Block 705 of process 700 may include identifying the various User SIDs associated with the user.

The foregoing disclosure has oftentimes partitioned devices and system into multiple modules (e.g., components, computers, servers) for ease of explanation. It is to be understood, however, that one or more modules may operate as a single unit. Conversely, a single module may comprise one or more subcomponents that are distributed throughout one or more locations. Furthermore, the communication between the modules may occur in a variety of ways, such as hardware implementations (e.g., over a network, serial interface, parallel interface, or internal bus), software implementations (e.g., database, passing variables), or a combination of hardware and software.

Moreover, in certain embodiments, the systems and methods described herein can advantageously be implemented using computer software, hardware, firmware, or any combination of software, hardware, and firmware. In one embodiment, the system is implemented as a number of software modules that comprise computer executable code for performing the functions described herein. In one embodiment, the computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers.

A skilled artisan will also appreciate, in light of this disclosure, that multiple distributed computing devices can be substituted for any one computing device illustrated herein. In such distributed embodiments, the functions of the one computing device are distributed such that some functions are performed on each of the distributed computing devices.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A system for managing user permissions in a computer network environment, the system comprising:
   a collection server;
   a first computing device of a plurality of network devices communicatively coupled to the collection server, the first computing device comprising:
   a first resource,
   a first data structure associated with the first resource, the first data structure identifying a first security identifier (SID) and a first permission granted to the first SID with respect to the first resource,
   a second resource,
   a second data structure associated with the second resource, the second data structure identifying a second SID and a second permission granted to the second SID with respect to the second resource, and
   a first SID index associating the first and second SIDs with, respectively, the first and second resources; and
   an aggregate index stored on the collection server, the aggregate index associating each of the first and second SIDs with the first computing device and associating a third SID with a second computing device of the plurality of network devices.

2. The system of claim 1, wherein the second computing device comprises:
   a third resource;

a third data structure associated with the third resource, the third data structure identifying the third SID and a third permission granted to the third SID with respect to the third resource;

a fourth resource;

a fourth data structure associated with the fourth resource, the fourth data structure identifying a fourth SID and a fourth permission granted to the fourth SID with respect to the fourth resource; and a second SID index associating the third and fourth SIDs with, respectively, the third and fourth resources, wherein the aggregate index further associates the fourth SID with the second computing device.

3. The system of claim 2, wherein the first, second, third and fourth data structures each comprises an access control list (ACL).

4. The system of claim 1, wherein at least one of the first and second SIDs comprises a group SID.

5. The system of claim 1, further comprising:

a third device of the plurality of network devices; and a fifth data structure associated with the third device, the fifth data structure identifying a fifth SID and a fifth permission granted to the fifth SID with respect to the third device, wherein the fifth data structure is stored on one of the plurality of network devices other than the third device.

6. The system of claim 5, wherein the third device does not include an operating system.

7. The system of claim 6, wherein the third device comprises an attached storage device.

8. The system of claim 1, wherein the first computing device further comprises a monitoring module configured to monitor changes in permissions associated with the first resource.

9. The system of claim 8, wherein the first computing device is configured to send selective update data to the aggregate index based on the monitored changes to permissions associated with the first resource.

10. The system of claim 1, wherein the aggregate index further identifies a type of the first resource associated with the first SID.

11. A method for managing user permissions in a network system, the method comprising:

for each of a plurality of computing devices of a network system:

scanning a plurality of data structures, each data structure being associated with at least one of a plurality of resources on the computing device, identifying from the plurality of data structures a plurality of security identifiers (SIDs) associated with a plurality of permissions granted to the plurality of SIDs with respect to the plurality of resources, and compiling a SID index associating the plurality of SIDs with the plurality of resources;

transmitting from each of the plurality of computing devices the respective plurality of SIDs and an identification of the corresponding computing device; and compiling at a collection server an aggregate index associating each of the plurality of SIDs with the identification of the corresponding computing device on which the particular SID was found.

12. The method of claim 11, wherein each of the plurality of data structures comprises a plurality of entries, wherein each data structure entry consists essentially of one of the plurality of SIDs and an identification of one of the plurality of resources.

13. The method of claim 12, wherein the aggregate index comprises a plurality of entries, wherein each aggregate index entry consists essentially of one of the plurality of SIDs and the identification of the corresponding computing device on which the particular SID was found.

14. The method of claim 11, additionally comprising monitoring changes in permissions of the plurality of resources on each of the plurality of computing devices.

15. The method of claim 14, additionally comprising determining if the changes in permissions affect the existence of one of the plurality of SIDs on one of the plurality of computing devices.

16. The method of claim 15, additionally comprising transmitting incremental data with respect to the one of the plurality of SIDs from the one of the plurality of computing devices to the collection server to update the aggregate index.

17. The method of claim 11, wherein one of the plurality of SIDs identified in the aggregate index is associated with multiple computing devices.

18. The method of claim 11, additionally comprising replicating the aggregate index to a plurality of servers.

19. A multi-tiered system for managing user permissions on a plurality of network devices, the multi-tiered system comprising:

a plurality of computing devices, each computing device further comprising:

means for identifying from a plurality of data structures attached to a plurality of resources on the computing device a plurality of security identifiers (SIDs) associated with a plurality of permissions granted to the plurality of SIDs for accessing the plurality of resources, and first means for associating each of the plurality of SIDs with the plurality of resources;

means for transmitting from each of the plurality of computing devices the respective plurality of SIDs and an identification of the corresponding computing device; and second means for associating each of the plurality of SIDs with the identification of the corresponding computing device on which each particular SID was found.

20. The system of claim 19, further comprising means for monitoring changes in the plurality of permissions and for updating said first and second means for associating.

* * * * *